United States Patent [19]

Jensen

[11] Patent Number: 4,616,478
[45] Date of Patent: Oct. 14, 1986

[54] ROTATABLE HYDROSTATIC TRANSMISSION

[76] Inventor: Falle Jensen, 44 W. Del Amo, Long Beach, Calif. 90805

[21] Appl. No.: 643,261

[22] Filed: Aug. 21, 1984

Related U.S. Application Data

[63] Continuation-in-part of Ser. No. 317,126, Oct. 30, 1981, abandoned.

[51] Int. Cl.⁴ ............................................. F16D 39/00
[52] U.S. Cl. ..................................... 60/487; 60/489; 91/505
[58] Field of Search ...................... 60/487, 489; 91/505

[56] References Cited

U.S. PATENT DOCUMENTS

| | | | |
|---|---|---|---|
| 1,274,391 | 8/1918 | Davis | 60/489 |
| 1,539,616 | 5/1925 | Williams | 91/505 |
| 1,910,054 | 5/1933 | Rayburn | 91/505 |
| 2,570,843 | 10/1951 | Orshansky, Jr. | 60/489 |
| 2,687,049 | 8/1954 | Ebert | 60/487 |
| 3,131,539 | 5/1964 | Creighton et al. | 60/487 |
| 3,616,726 | 11/1971 | Ruger | 91/505 |

FOREIGN PATENT DOCUMENTS 455931  4/1949  Canada ................. 60/487

Primary Examiner—A. Michael Chambers
Attorney, Agent, or Firm—Charles H. Thomas

[57] ABSTRACT

A rotatable hydrostatic transmission is formed by a hydraulic pump and a hydraulic motor which are coupled coaxially together. The pump and motor both have housing members and shaft members which are independently rotatable relative to a mounting structure. One member of the pump is rigidly coupled to one member of the motor, and the coupled members rotate together as a unit. The other member of the pump is an input and the other member of the motor which is not rigidly coupled is the output member. Reduction gearing is provided between the coupled members and the output member. A fluid flow control means provides an infinitely adjustable control of fluid through the pump and the motor and allows the speed of rotation of the driven output member to be varied in infinitely adjustable fashion. A direct drive can be achieved by disengaging the reduction gearing so that the shafts and housings of both the pump and motor will all turn at the same speed as if they were one single unit. A reverse rotation of the driven output member can be achieved by reversing fluid flow while preventing the rigidly coupled members from rotating.

4 Claims, 3 Drawing Figures

ROTATABLE HYDROSTATIC TRANSMISSION

This is a continuation-in-part of U.S. patent application Ser. No. 317,126 filed on Oct. 30, 1981, now abandoned.

BACKGROUND OF THE INVENTION

1. Field of the Invention

The present invention relates to hydrostatic drive transmissions.

2. Description of the Prior Art

Conventional hydrostatic transmissions employ a hydraulic pump which operates a hydraulic motor. The shafts of conventional pumps and motors rotate within housings which are anchored to a mounting, such as a vehicle chassis. Such drives are used in slow moving vehicles, but are subject to considerable power loss and wear. Moreover, these drives are not adaptable to vehicles moving at higher speeds.

SUMMARY OF THE INVENTION

The present invention is a rotatable hydrostatic transmission. According to the invention a hydraulic pump and a hydraulic motor are coaxially mounted relative to a support structure. A closed circuit fluid loop is defined through the pump and motor. One member, either the housing or the shaft of the pump, is rigidly coupled coaxially with one member, either the housing or the shaft, of the motor. The rigidly coupled members rotate together as a unit. The rigidly coupled members and the other members all rotate about a common axis. The rigidly coupled members may be the pump shaft and motor housing, the pump shaft and motor shaft, the pump housing and motor housing, or the pump housing and motor shaft.

The member of the pump which is not rigidly coupled to a member of the motor serves as the transmission input. Conversely, the member of the motor which is not rigidly coupled to a member of the pump serves as an output.

Unlike prior hydrostatic transmissions, neither the pump nor the motor housing is anchored to a mounting or frame. Instead, the members of the pump and motor which are coupled together rotate at a slower speed than does the driven output member. This is achieved by means of a reduction gearing which is interposed between the coupled members and the driven output member of the motor.

A total elimination in relative rotation between the shafts and housings of the pump and motor can be achieved when the speed ratio between the input and output members is 1:1. The shaft and housings of the pump and the motor can all be rotated at the same speed by disengaging the reduction gearing. As at any time when the coupled members are free to rotate, the input torque to the transmission will equal the output torque. The rotatable hydrostatic transmission of the present invention overcomes the shortcomings of other hydrostatic drives by greatly reducing the speed of relative rotation between the members of the pump and the motor, thereby reducing losses and wear.

The transmission of the invention involves a control means for providing an infinite degree of control of hydraulic fluid flow in a loop through the pump and the motor. This control may be in the form of a mechanism for altering the displacement of the hydraulic pump. Alternatively, a speed control may be provided by a flow control or by-pass valve which creates an infinitely variable degree of hydraulic fluid flow through the circulation loop. Numerous other conventional control devices may be used to control hydraulic fluid flow through the system.

One object of the invention is to provide a transmission that is simple to maintain and operate and which has features which are easily automated. Automation may be performed either with hydraulic or electric means so that a combustion engine in a vehicle at any given speed will be operated at its most efficient rotational speed (R.P.M.) for the purpose of maximizing efficiency in regard to fuel consumption and for the purpose of minimizing pollution.

The transmission of the invention may be utilized in any application where an infinite degree of adjustment of rotational speeds between input and output members is desirable.

DESCRIPTION OF THE EMBODIMENTS

Figure 1:
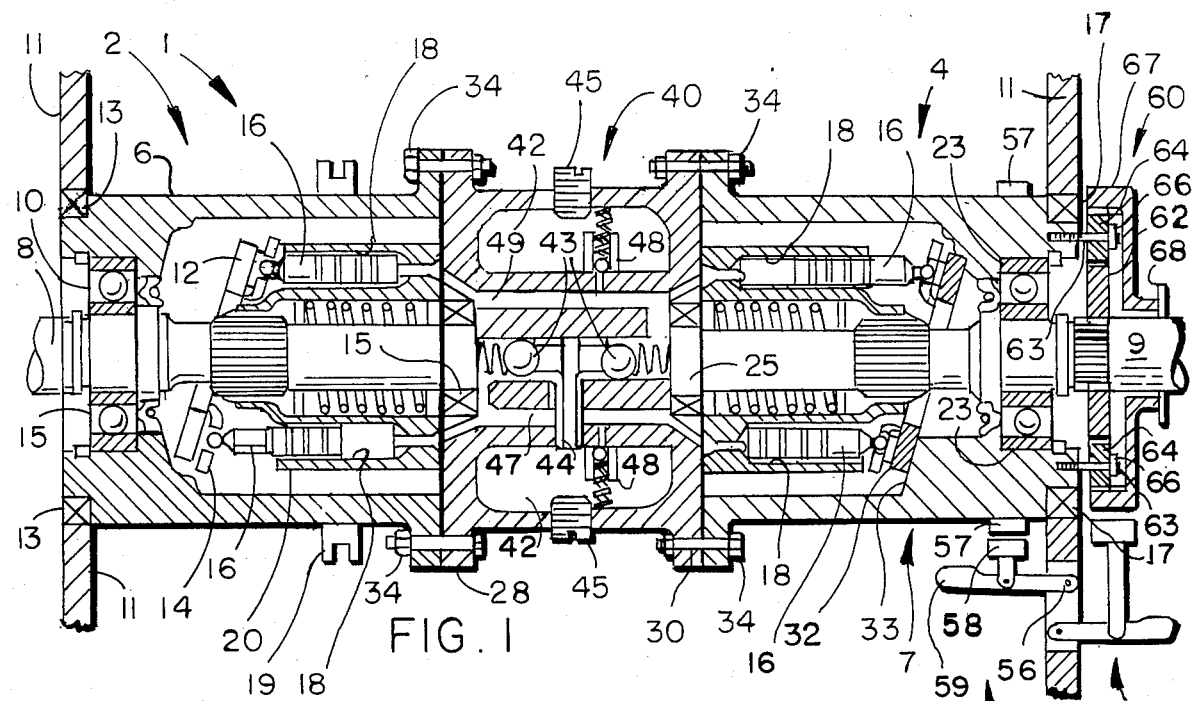
FIG. 1 is a cross sectional elevational view of a preferred embodiment of the rotatable hydrostatic transmission of the invention.

One embodiment of the invention is depicted in FIG. 1. According to this embodiment, a hydrostatic transmission 1 includes a hydraulic pump 2 and hydraulic motor 4 joined together by a fluid transfer section 40. A reduction gearing system 60 with at least one gear ratio is also employed.

The hydraulic pump 2 and motor 4 are of a combination type, and either of these devices can be operated alternatively as a hydraulic pump or as a hydraulic motor. The direction of rotation is reversible by reversing the direction of fluid flow. The details of construction of the pump 2 and the motor 4 are well known to those familiar with hydraulic pumps and motors.

The hydraulic pump 2 is a variable displacement pump and includes a housing member 6 which is rotatable within bearings 13 relative to a fixed mounting support 11. The mounting support 11 may, for example, be the chassis of a vehicle or machine.

The hydraulic pump 2 has a rotary input member which, in the embodiment of FIG. 1, is a shaft 8 disposed coaxially with the housing 6. The input member 8 is supported relative to the housing member 6 by bearings 10 and 15, as illustrated in FIG. 1.

The variable displacement pump 2 includes a swashplate 12 and a retractor ring 14 located adjacent thereto. The retractor ring 14 captures the protruding ends of pistons 16 which reciprocate within longitudinal bores 18 within a cylinder block 20. The cylinder block 20 is splined to the input member 8 of the pump 2, and rotates in communication with the transverse flange 28 of the fluid transfer section 40. The flange 28 thereby performs the function of a valveplate for the pump 2.

An annular displacement control collar 19 is mounted coaxially about the housing member 6 and is moveable therealong in a direction parallel to the axis of the input member 8. A lever mechanism 21, which is visible in the embodiment of FIG. 2, connects the displacement control collar 19 to the swashplate 12, which is visible in the embodiment of FIG. 1. The lever mechanism 21 controls the angular disposition of the swashplate 12 relative to the axis of the rotary input member 8.

The fluid transfer section 40 is formed with two ducts 47 and 49, each having an overload relief valve 48. The ducts 47 and 49 extend lengthwise through the transfer section 40 and both communicate at opposite ends with the pump 2 and motor 4. Two check valves 43 are located at the center of the fluid transfer section 40. Hydraulic fluid is admitted through the check valves 43 to replenish fluid in the system when needed.

The fluid transfer section 40 also includes a hydraulic fluid reservoir 42 with filler inlets which are blocked by plugs 45. The reservoir 42 is rigidly mounted about the annular core of the fluid transfer section 40 and rotates therewith, although it could be constructed as a separate, stationary unit. A radial duct 44 extends from the reservoir 42 into the core of the fluid transfer section 40 to provide a path of fluid flow from the reservoir 42 to the ducts 47 and 49 through the check valves 43 when replenishing fluid is required.

At opposite ends of the fluid transfer sections 40 there is a pair of flanges 28 and 30 which act as valves and as end plates for the pump 2 and motor 4. The flanges 28 and 30 are perforated with spaced bores which are threaded to receive the machine bolts 34.

The hydraulic motor 4 is a fixed displacement motor, but otherwise is quite similar in construction to the pump 2. The swashplate 32 is disposed at a fixed angle relative to the axis of the motor 4 by an internal stop 33.

The motor 4 has a housing member 7 which is mounted for rotation relative to the fixed mounting support 11 by means of bearings indicated at 17. The flange 30 of the fluid transfer section 40 is connected to the opposite end of the housing member 7 by means of machine bolts 34. As previously stated, the flange 30 serves as both a valve and an endplate for the motor 4.

A power output member in the form of a shaft 9 is supported within the motor 4 relative to the housing member 7 by means of bearings 23 and 25. As in the pump 2, the pistons 16 reciprocate in the cylinder block 20 of the motor 4, and the cylinder block 20 is splined to the output member, which in the embodiment of FIG. 1 is the shaft 9. The only difference between the motor 4 and the pump 2 is that the pump 2 is a variable displacement device, while the motor 4 has a fixed displacement. Otherwise, the construction of the motor 4 is the same as that of the pump 2, and common parts in the pump 2 and the motor 4 are indicated by the same reference numbers.

As is evident from FIG. 1, the housing 6 of the pump 2 is rigidly coupled to the housing 7 of the motor 4 by means of the fluid transfer section 40. Machine bolts 34 rigidly join the housing members 6 and 7 to the fluid transfer section 40. A brake 55 is employed to stop the coupled housing members 6 and 7 from rotating when the transmission is driven in reverse. The brake 55 includes an annular brake drum 57 which is secured to the outer surface of the motor housing 7. A brake shoe 58 is radially moveable relative to the brake drum 57 by means, for example, of a lever 59 which rotates about a fulcrum 56 on the mounting support 11.

A reduction gearing system or means is employed in the transmission 1 of FIG. 1. The reduction gearing 60 in the embodiment of FIG. 1 is a single planetary gearing system which consists of a sun gear 62 rigidly attached to the output member 9. Two studs 63 are securely anchored in the housing member 7 and serve as planet carriers. The pinion gears 64 are rotatably mounted on the studs 63 and are secured by snap rings 66. A ring gear 67 is mounted coaxially about the output member 9, and in freely rotatable fashion thereon. The ring gear 67 is secured on the putput member 9 by a snap ring 68.

The reduction ratio of the reduction gearing 60 is predetermined and can be chosen to be almost any ratio. A ratio of 1.5:1 may be preferred. Alternatively, a system with more than one speed reduction ratio may be employed. With the reduction gearing 60 engaged, the rigidly coupled members 6 and 7 of the pump 2 and the motor 4, respectively, turn at a slower speed than the speed of the output member, which in the embodiment of FIG. 1, is the shaft 9. A brake 70, similar in construction to the brake 55, serves to engage and disengage the reduction gearing 60. This function is well known in the trade.

To operate the transmission 1 in the embodiment of FIG. 1, the system is first filled with hydraulic fluid. A rotary driving input is provided on the driving input member, which in this embodiment is the shaft 8. Since the cylinder block 20 of the pump 2 is in splined engagement with the driving input member 8, the cylinder block 20 rotates with the shaft 8. Both the driving input member 8 and the cylinder block rotate relative to the housing member 6 of the pump 2 and relative to the swashplate 12 which is carried by the housing member 6.

As the cylinder block 20 rotates relative to the tilted swashplate 12 of the pump 2, the pistons 16 are driven in reciprocation within the cylinder bores 18, alternately forcing hydraulic fluid out of some of the cylinder bores 18 while drawing hydraulic fluid into oppositely disposed cylinder bores 18 through the ducts 47 and 49 in the transfer section 40. The ducts 47 and 49 are arranged in the transfer section 40 so that the pistons pass the inlet duct 49 as they are pulled out of the cylinders 18 and so that the pistons pass the duct 47 as they are forced back into the bores 18. Arcuate slots in the valve plates 28 and 30 insure a path of hydraulic fluid flow throughout the rotation of the cylinder block 20.

The hydraulic pump 2 is a variable displacement inline piston pump. That is, the swashplate 12 resides at a selected angle relative to the drive member 8. This angle is governed by longitudinal movement of the displacement control collar 19 by means of a shifting fork (not shown). The longitudinal movement of the control collar 19 along the outer surface of the housing 6 operates the lever mechanism 21 to control the tilt or angular disposition of the swashplate 12 within the housing member 6. The collar 19 and the swashplate 12 thereby provide an infinite degree of control of hydraulic fluid flow in the loop extending between the pump 2 and the motor 4. That is, when the control collar 19 is moved to the left in FIG. 1, the swashplate 12 can be moved to a position at which it is perpendicular to the input drive member 8. With the swashplate 12 in this position, there will be no reciprocation of the pistons 16 within the bores 18 despite rotation of the input drive member 8. Consequently, there will be no hydraulic fluid flow through the loop and the output member 9 will not rotate. This position may be described as a neutral position.

As the control collar 19 is moved to the right in FIG. 1, the angle of orientation of the swashplate 12 of the pump 2 is varied relative to the input drive member 8. As a result, the pistons 16 will reciprocate within the bores 18 in the cylinder block 20 as the input drive member 8 rotates. The reciprocation of the pistons 16 pumps fluid through the motor 4, thereby driving the power output member, which in the embodiment of FIG. 1, is the shaft 9 of the motor 4. By a comparable reciprocation of the pistons 16 in the cylinder block 20 of the housing 7 of the motor 4, the fluid returns through the transfer section 40 to the pump 2.

Torque in the motor 4 is generated by fluid pressure acting upon the ends of the pistons 16 within the bores 18. This pressure causes the pistons 16 to bear longitudinally on the tilted, plate 32 of the motor 4. The reaction of the pistons 16 against the swashplate 32 of the motor 4. The reaction of the piston 16 against the swashplate 32 of the motor 4 causes the cylinder block 20 thereof to rotate. Since the output member 9 is splined to the cylinder block 20, the output member 9 is also turned in rotation in reaction to pressure upon the pistons 16 within the motor 4. As explained, adjustment of the control collar 19 axially along the outside of the housing 7 of the pump 2 controls the length of the stroke of the pistons 16 in the pump 2. The stroke length, and hence the pump displacement, can thereby be varied in infinitely adjustable fashion. This controls the flow rate of hydraulic fluid in the loop through the motor 4 and the pump 2, thereby controlling the speed of rotation of the power output member 9.

While the swashplate 12 in the pump 2 is depicted as being oriented at an inclination up and to the right in FIG. 1, it is to be understood that the collar 19 can be moved to the left, past a position where the swashplate 12 is perpendicular to the shaft 8, and further to the left to a position at which the swashplate 12 is inclined upwardly and to the left, rather than upwardly and to the right as depicted in FIG. 1. When the swashplate 12 is adjusted so that it is inclined upwardly and to the left as viewed from the position of FIG. 1, the direction of hydraulic fluid flow in the system is reversed. That is, the duct 47 becomes the inlet duct and the duct 49 becomes the outlet duct. Under such conditions the power output member 9 will rotate in a direction opposite to the direction of rotation of the power input member 8. The members which are coupled together, which in the embodiment of FIG. 1 are the housing members 6 and 7 of the pump 2 and the motor 4 respectively, must be prevented from rotating by disengaging the brake 70 and engaging the brake 55. By moving the control collar 19 to the right so that the swashplate 12 is tilted as depicted in FIG. 1, and by engaging the reduction gearing 60 by engaging the brake 70, and while disengaging the brake 55, the output member 9 will then turn in the same direction of rotation as the input member 8. Simultaneously, the rigidly coupled members 6 and 7 of the pump 2 and motor 4 will also turn in the same direction, but at a slower speed of rotation than the output member 9. This reduced speed results from engagement of the reduction gearing 60.

By moving the control collar 19, the output gear ratio may be changed as previously explained. When a gear ratio of or close to 1:1 is reached, a direct drive without internal motion can be achieved by disengaging the reduction gearing 60 through a release of the brake 70. This causes the input member 8 and the output member 9, together with the rigidly coupled members 6 and 7, to all obtain the same rotational speed and there is no motion within the pump 2 and the motor 4. All fluid motion and all relative rotation between pump and motor ceases, and the entire transmission 1 acts and turns as one solid unit.

For ease of operation, the brakes 55 and 70 can be operated with a simple hookup so that when the output member is to be driven in reverse, the brake 70 disengages and the brake 55 engages. For a forward drive of the output member, the brake 55 is disengaged and the brake 70 is engaged. For direct drive both the brakes 55 and 70 are disengaged. The hookup which is used to achieve the foregoing combination of engagement and disengagement of the brakes 55 and 70 can be performed with conventional, mechanical, electrical or hydraulic interacting arrangements.

Figure 2:
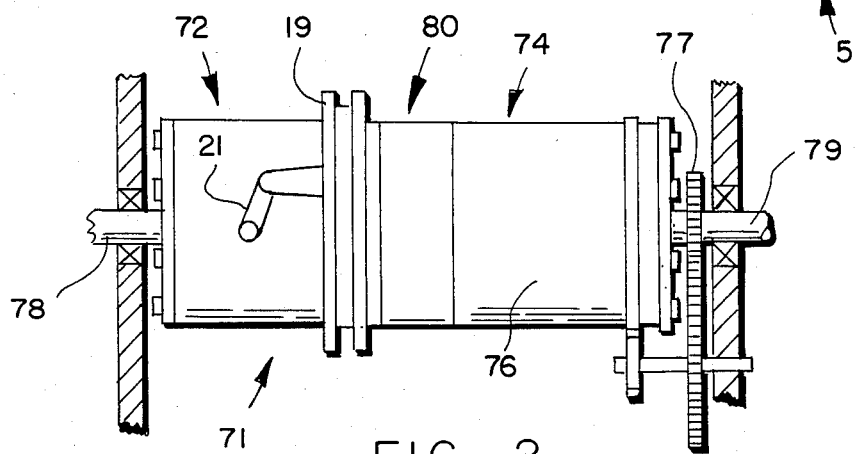
FIG. 2 is an elevational view of an alternative embodiment of the invention.
Figure 3:
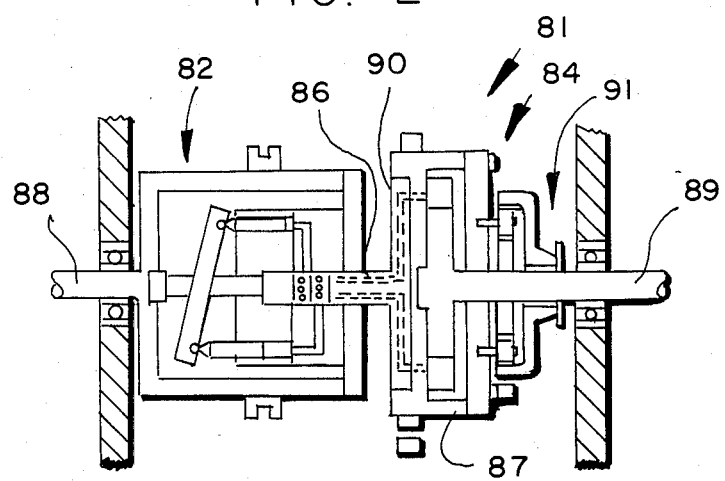
FIG. 3 is a sectional elevational view of another alternative embodiment of the invention.

FIGS. 2 and 3 show other embodiments of the transmission of the invention which are merely shown to substantiate the claims and no claims are directly attached thereto. FIG. 2 shows a rotatable transmission 71 and shows, more clearly than FIG. 1, the control collar 19 and the lever mechanism 21. FIG. 2 illustrates that a pump 72, a transfer section 80, a motor 74 and a reduction gearing system 77 may be built into one single housing 76. The shaft 78 of the pump 72 serves as the transmission input, and the shaft 79 of the motor 74 serves as the output.

FIG. 3 shows another embodiment of a transmission which falls within the scope of the invention. The rotatable transmission 81 of FIG. 3 has a piston pump 82, a gear motor 84, a transfer section 90, and a reduction gearing system 91. The pump 82 has a housing member with an axial extrusion forming the input member 88. The shaft member 86 from the pump 82 is rigidly coupled to the housing member 87 of the motor 84. The output member 89 is the shaft of the gear motor 84. The shaft 86 and the housing 87 are the rigidly coupled members of the pump 82 and the motor 84, respectively.

Various common functions may be substituted or added to the invention illustrated in the drawings. For example, a replenishing pump may be added. Also, a stationary and separate fluid reservoir can be connected to the rotatable components of the transmission with hydraulic swivel connections. Also, other types of pumps and motors, other than the piston type pump and gear motor illustrated, may be employed. Furthermore, more than one ratio of reduction gearing may be used. Also, it may be desirable to balance the unit. Other changes and modifications will also become readily apparent to those familiar with hydraulic transmissions.

Accordingly, the scope of the invention should not be construed as limited to the specific embodiments illustrated and described, but rather is defined in the claims appended hereto.

I claim:
1. A rotatable hydrostatic transmission comprising:
   a hydraulic pump and a hydraulic motor each having a rotatable housing member at one end and a rotary shaft member at the other end with bearing means supporting said shaft member in said housing member so that said shaft member protrudes from said housing member, and said shaft members and said housing members of said hydraulic pump and said hydraulic motor are all aligned for rotation about a common axis, and wherein one member of said pump is rigidly coupled coaxially with one member of said motor so that said rigidly coupled members rotate together as a unit, and wherein the other member of said pump is an input and the other member of said motor is an output,
   a driving input connected to said other member of said pump, a driven output connected to said other member of said motor, hydraulic fluid transfer means coupled to allow hydraulic fluid flow between said pump and said motor to accommodate differences in rotational speed between said driving input and said driven output, whereby a hydraulic fluid circulation loop is defined through said transfer means and said hydraulic pump and said hydraulic motor, and said loop is filled with hydraulic fluid, a hydraulic fluid reservoir means coupled to provide hydraulic fluid to said hydraulic pump and motor through said hydraulic transfer means, and control means for providing an infinite degree of control of hydraulic fluid flow in said loop.

2. A rotatable hydrostatic transmission according to claim 1 further comprising a gearing means interposed between said coupled members of said pump and said motor and said driven output to control said coupled members to follow said output member in rotation at at least one predetermined rotational speed.

3. A rotatable hydrostatic transmission according to claim 1 including means for selectively stopping the coupled members from rotation.

4. A rotatable hydrostatic transmission according to claim 2 in which said gearing means includes means for engaging and disengaging said gearing means.

* * * * *